United States Patent
Mitric et al.

(10) Patent No.: US 12,535,475 B2
(45) Date of Patent: Jan. 27, 2026

(54) ELECTRICAL STABILITY PROBE WITH TEMPERATURE SENSOR

(71) Applicant: SCHLUMBERGER TECHNOLOGY CORPORATION, Sugar Land, TX (US)

(72) Inventors: Bojan Mitric, Houston, TX (US); Brian Ligertwood, Houston, TX (US); Jerry Thomas Connaughton, Houston, TX (US); Zakhar Chizhov, Houston, TX (US)

(73) Assignee: SCHLUMBERGER TECHNOLOGY CORPORATION, Sugar Land, TX (US)

(*) Notice: Subject to any disclaimer, the term of this patent is extended or adjusted under 35 U.S.C. 154(b) by 0 days.

(21) Appl. No.: 19/108,803

(22) PCT Filed: Aug. 18, 2023

(86) PCT No.: PCT/US2023/072483
§ 371 (c)(1),
(2) Date: Mar. 5, 2025

(87) PCT Pub. No.: WO2024/040230
PCT Pub. Date: Feb. 22, 2024

(65) Prior Publication Data
US 2025/0258155 A1    Aug. 14, 2025

Related U.S. Application Data

(60) Provisional application No. 63/371,953, filed on Aug. 19, 2022.

(51) Int. Cl.
*G01N 33/28* (2006.01)
*B08B 1/30* (2024.01)

(52) U.S. Cl.
CPC .......... *G01N 33/2823* (2013.01); *B08B 1/30* (2024.01)

(58) Field of Classification Search
CPC .................... G01N 33/2823; B08B 1/30
See application file for complete search history.

(56) References Cited

U.S. PATENT DOCUMENTS 7,701,229 B2 *  4/2010  Murphy ............. G01N 33/2823
                                                    324/366
2018/0348255 A1  12/2018  Manzano et al.
2019/0369132 A1  12/2019  Nonaka et al.

FOREIGN PATENT DOCUMENTS

| CN | 105588703 A | 5/2016 | |
|---|---|---|---|
| JP | 2009162519 A | 7/2009 | |
| WO | WO-2009062041 A2 * | 5/2009 | ............. G01N 27/92 |
| WO | 2014127379 A1 | 8/2014 | |

OTHER PUBLICATIONS

International Search Report and Written Opinion of International Patent Application No. PCT/US2023/072483 dated on Dec. 11, 2023, 11 pages.

* cited by examiner

*Primary Examiner* — Kristina M Deherrera
*Assistant Examiner* — Jean F Morello
(74) *Attorney, Agent, or Firm* — Jeffrey D. Frantz

(57) ABSTRACT

A fluid electrical probe includes a body portion housing a cleaner, a head portion forming a gap, an electrode disposed in the gap, and a temperature sensor disposed in the gap. The cleaner is extendable into the gap to clean the electrode and the temperature sensor. The body portion comprises a handle configured to be gripped by an operator.

20 Claims, 4 Drawing Sheets

ELECTRICAL STABILITY PROBE WITH TEMPERATURE SENSOR

CROSS-REFERENCE TO RELATED APPLICATION

This application is the National Stage Entry of International Application No. PCT/US2023/072483, filed Aug. 18, 2023, which claims priority to and the benefit of U.S. Provisional Application Ser. No. 63/371,953, entitled "Electrical Stability Probe with Temperature Sensor" and filed Aug. 19, 2022, the disclosure of which is incorporated herein by reference in its entirety for all purposes.

FIELD

This patent application addresses electrical probes. Specifically, electrical stability probes having incorporated temperature sensors and/or cleaners are described herein.

BACKGROUND

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

To perform an electrical stability test on a fluid, an electrical stability probe is used to detect an electrical property of the fluid. The electrical stability probe generally applies a sinusoidal voltage across a gap containing the fluid. Magnitude of the sinusoidal voltage is ramped upward and any current flowing across the gap is monitored. The electrical stability probe reports a peak voltage when a current that corresponds to a target or threshold value (e.g., 61 microamperes ($\mu A$)) is detected.

The American Petroleum Institute (API) 13B-2 standard for an electrical stability test requires averaging two discrete measurements taken at a fluid temperature of 50° C. ±2° C. (120° F. ±5° F.) using an electrical stability probe having electrodes with specific dimensions separated by a specific gap along with specific voltage reading circuitry. Typically, to perform the electrical stability test in compliance with the API 13B-2 standard, an operator uses a thermometer to verify that the fluid temperature of a fluid sample falls within specifications of API 13B-2, then performs a first measurement followed by a probe cleaning operation before proceeding to a second measurement. To achieve compliance with the API 13B-2 standard, the first and second measurements must be within 5 percent of each other. However, measuring the fluid temperature and completing the probe cleaning operation are time consuming, and use of multiple different implements (e.g., the thermometer, the electrical stability probe, and/or a cleaner that are physically separate implements) increases likelihood of inaccurate measurements. There is a need for a way to measure electrical stability of a fluid with more relatable temperature measurement and more expeditious probe cleaning.

SUMMARY

A summary of certain embodiments disclosed herein is set forth below. It should be understood that these aspects are presented merely to provide the reader with a summary of these certain embodiments and that these aspects are not intended to limit the scope of this disclosure. Indeed, this disclosure may encompass a variety of aspects that may not be set forth below.

In certain embodiments, a fluid electrical probe includes a body portion housing a cleaner, a head portion forming a gap, an electrode disposed in the gap, and a temperature sensor disposed in the gap. The cleaner is extendable into the gap to clean the electrode and the temperature sensor.

In certain embodiments, a monitoring system includes a fluid electrical probe comprising a housing. The housing includes a handle with a conduit that slidingly supports a cleaner and a head structure with opposed surfaces that define a gap and support an electrode at the gap. The cleaner is adjustable between a retracted position in which the cleaner is withdrawn from the gap and an extended position in which the cleaner extends into the gap to clean the electrode.

In certain embodiments, a method of measuring an electrical property of a fluid includes obtaining a probe with a body portion housing a cleaner, a head portion forming a gap, an electrode disposed in the gap, and a temperature sensor disposed in the gap, wherein the cleaner is extendable into the gap. The method also includes using the temperature sensor to measure a temperature of the fluid. The method further includes extending the cleaner to clean the electrode and the temperature sensor. The method further includes using the electrode to measure the electrical property of the fluid.

BRIEF DESCRIPTION OF THE DRAWINGS

Various features, aspects, and advantages of the present disclosure will become better understood when the following detailed description is read with reference to the accompanying figures in which like characters represent like parts throughout the figures, wherein.

DETAILED DESCRIPTION

One or more specific embodiments of the present disclosure will be described below. The described embodiments are only exemplary of the present disclosure. Additionally, to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

An electrical stability probe described herein incorporates (e.g., integrates; built-in) a temperature sensor and/or a cleaner to enable efficient measurement of electrical stability in a material (e.g., a fluid). For example, the electrical stability probe described herein may incorporate both the temperature sensor and the cleaner to provide a single implement (e.g., tool) for temperature measurement and probe cleaning to enable efficient measurement of the electrical stability in the material. Use of the single implement, as described herein, may reduce time and/or distance between the temperature measurement and the electrical stability measurement (e.g., as compared to use of separate implements for the temperature measurement and the electrical stability measurement), which reduces a chance that the electrical stability measurement is taken at a temperature outside a standard range (e.g., a target range; set by API 13B-2).

Figure 1:
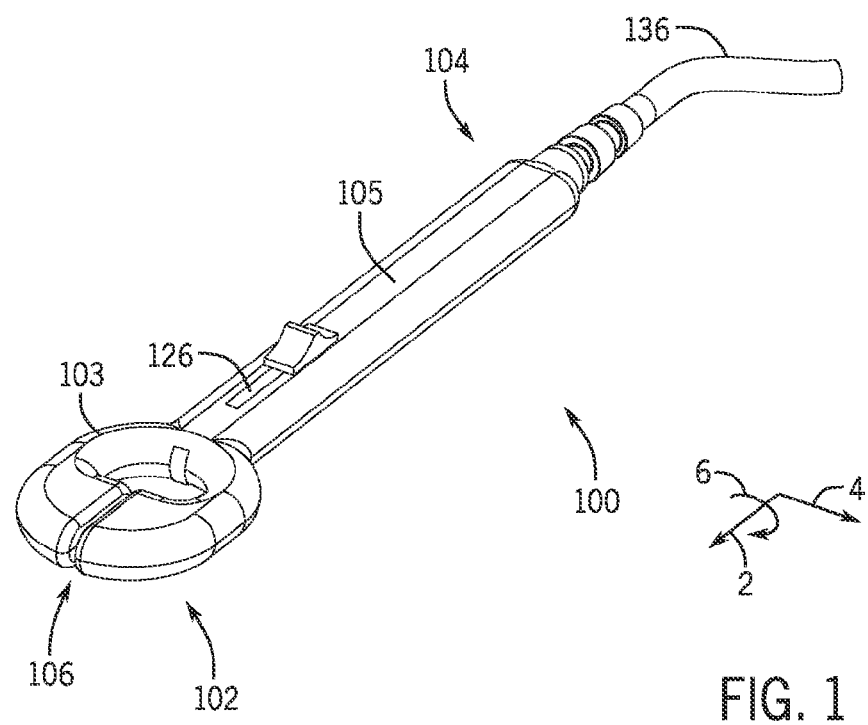
FIG. 1 is an isometric view of an electrical stability probe, according to an embodiment.

FIG. 1 is an isometric view of an electrical stability probe 100, according to an embodiment. As described herein, the electrical stability probe 100 may be utilized to measure electrical properties (e.g., electrical stability) in a material (e.g., a fluid, which is typically a liquid; drilling fluid for drilling operations to access natural resources; oil-based drilling fluid; synthetic-based drilling fluid). For example, the electrical stability probe 100 may be handled by an operator (e.g., human operator) and inserted into a sample of the material to measure the electrical properties in the material. To facilitate discussion, the electrical stability probe 100 and its components may be described with reference to an axial axis or direction 2, a lateral axis or direction 4, and/or a circumferential axis or direction 6.

As shown in FIG. 1, the electrical stability probe 100 has a head portion 102 and a body portion 104 connected to the head portion 102. The head portion 102 includes a head structure 103 (e.g., frame; paddle; electrode holder), and the body portion 104 includes a handle 105 (e.g., rod) configured to be gripped by the operator. It should be appreciated that the head structure 103 and the handle 105 may be two separate components that are coupled to one another (e.g., via fasteners, such as bolts or welds) or may be a one-piece structure (e.g., integrally formed, such as via molding or printing). Together, the head structure 103 and the handle 105 may be considered to form or be part of a housing of the electrical stability probe 100.

Figure 2:
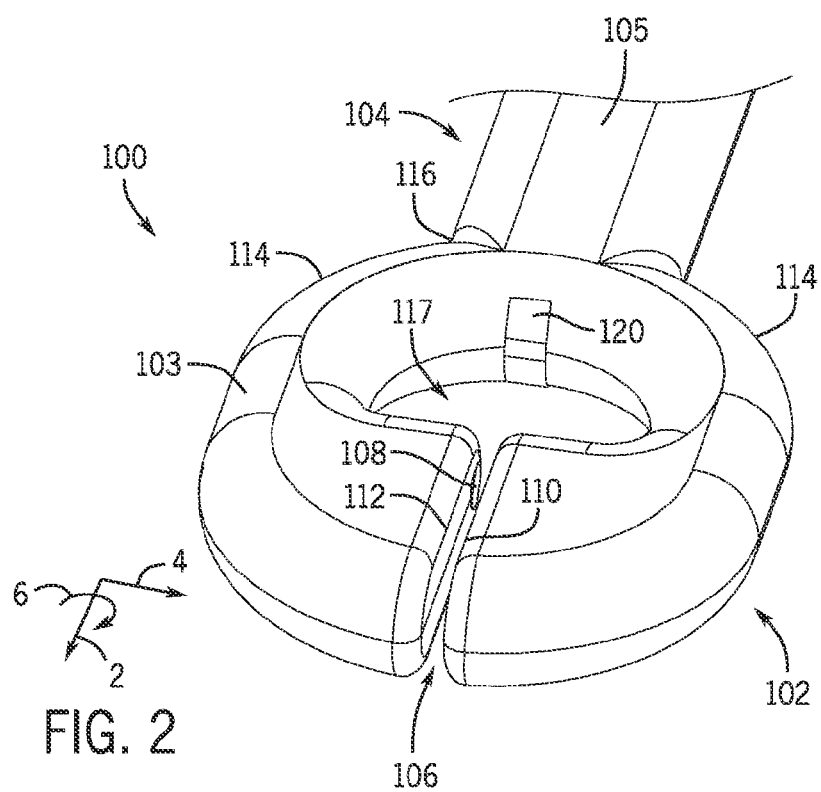
FIG. 2 is a detail view of a head portion of the electrical stability probe of FIG. 1, according to an embodiment.

FIG. 2 is a detail view of the head portion 102 of the electrical stability probe 100 of FIG. 1, according to an embodiment. The head portion 102 has the head structure 103 that defines a gap 106 to accommodate the material for analysis. Electrodes 108 are positioned at the gap 106 to create an electric field within the gap 106 to analyze the electrical properties of the material in the gap 106. In particular, the gap 106 is defined by a first surface 110 (e.g., axially-extending; laterally-facing) and a second surface 112 (e.g., axially-extending; laterally-facing) of the head structure 103. The first surface 110 and the second surface 112 generally face each other (e.g., positioned as opposed surfaces), and the electrodes 108 are generally arranged at the first surface 110 and the second surface 112. In certain embodiments, the first surface 110 and the second surface 112 are flat surfaces that face each other and that are parallel (e.g., parallel or substantially parallel, accounting for manufacturing variations and/or within manufacturing tolerances) to one another, as this may simplify analysis of the electrical properties of the material in the gap 106.

As shown, the head structure 103 includes or is formed by two prongs 114 (e.g., arms) that extend from the body portion 104 (e.g., from the handle 105) to the gap 106. In this case, the two prongs 114 extend and/or diverge from an end 116 (e.g., distal end; end portion) of the body portion 104 that defines a transition from the body portion 104 to the head portion 102. In particular, the two prongs 114 extend from and/or diverge from the end 116 of the body portion 104, and the two prongs 114 also extend (e.g., bend or curve) away from each other to form an opening 117 (e.g., through hole). The opening 117 is located between the two prongs 114 along the lateral axis 4, and also between the end 116 of the body portion 104 and the gap 106 along the axial axis 2. As shown, the head structure 103 with the two prongs 114 may define a planar structure with a c-shape (e.g., rounded portions, such as the two prongs 114, that curve to form the first surface 110 and the second surface 112 to define the gap 106). It should be noted that any of a variety of geometries and configurations are envisioned. For example, the head structure 103 may not include the prongs 114, the head structure 103 may extend from another location other than the end 116 of the body portion 104, and/or the head structure 103 and/or the prongs 114 may have another geometry and/or configuration.

Figure 3:
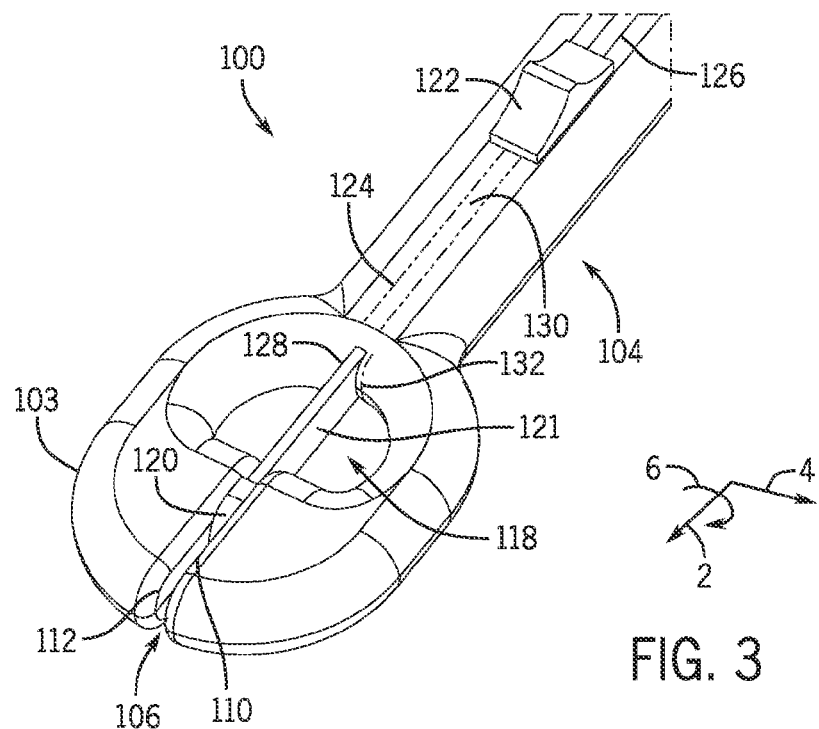
FIG. 3 is a detail view of the head portion of the electrical stability probe of FIG. 1, wherein a cleaner is in an extended position, according to an embodiment.

FIG. 3 is a detailed view of the head portion 102 of the electrical stability probe 100 of FIG. 1, according to an embodiment. As shown, a cleaner 118 is disposed in and/or supported by the body portion 104 (e.g., by the handle 105). The cleaner 118 is extendable from the body portion 104 and retractable to the body portion 104 (e.g., transitions or moves between an extended position in which the cleaner 118 extends from the body portion 104 and into the gap 106 and a retracted position in which the cleaner 118 is retracted within the body portion 104 and withdrawn from the gap 106).

In particular, the cleaner 118 is extendable from the body portion 104 to the gap 106, such that a cleaning tip 120 (e.g., cleaning end portion; distal end portion) of the cleaner 118 extends into the gap 106. With reference to FIG. 3, the cleaning tip 120 extends into the gap 106 while the cleaner 118 is in the extended position. Further, the cleaner 118 is retractable to the body portion 104, such that the cleaning tip 120 is withdrawn from the gap 106. With reference to FIG. 2, the cleaning tip 120 is withdrawn from the gap 106 while the cleaner 118 is in the retracted position. As shown in FIG. 2, the cleaning tip 120 may also be withdrawn from the opening 117 while the cleaner 118 is in the retracted position, such as to be flush with an inner surface of the head structure 103 that defines the opening 117. In this case, the gap 106 is generally parallel to the body portion 104 (e.g., the gap 106 and the body portion 104 extend in the axial direction 2; the cleaner 118 moves in the axial direction 2; a central axis of the gap 106 is generally aligned with a central axis of the body portion 104 to provide a path for the cleaner 118 to extend into the gap 106 from the body portion 104).

A slide member 122 is attached to the cleaner 118 at a location that is within the body portion 104 (e.g., the handle 105). The electrical stability probe 100 has a conduit 124 (e.g., passageway) that extends along the axial axis 2, and the cleaner 118 is slidably disposed in the conduit 124. The slide member 122 extends through a cleaner opening 126 (also shown in FIG. 1) to connect to the cleaner 118 in the conduit 124 (e.g., with a fixed connection, such as via a fastener) and to be accessible at an exterior side location of the body portion 104. Thus, the slide member 122 can be operated (e.g., manually by the operator; contacted by the operator; to slide along the body portion 104) to extend the cleaner 118 out of the conduit 124 so the cleaning tip 120 can enter the gap 106 and contact the first surface 110 and the second surface 112 of the head structure 103, as shown in FIG. 3. Moving the slide member 122 along the body portion 104 toward the head portion 102 extends the cleaner 118 and the cleaning tip 120 from the conduit 124 across the opening 117 to insert the cleaning tip 120 into the gap 106. Moving the slide member 122 along the body portion 104 away from the head portion 102 retracts the cleaner 118 and the cleaning tip 120 from the gap 106 into the conduit 124 through an end opening 128 of the conduit 124. It should be appreciated that any suitable mechanical member may be utilized to move the cleaner 118 within the conduit 124. For example, in lieu of the slide member 122 that slides axially along the body portion 104, a mechanical member may include a rotatable member (e.g., rotatable knob that can be gripped and rotated relative to the body portion 104 by the operator). In such cases, rotation of the rotatable member may move the cleaner 118 within the conduit 124 as described herein (e.g., via a series of linkages and/or gears, such as worm drive).

The cleaner 118 may include a rod 121 that supports the cleaning tip 120. The rod 121 may be formed from a material (e.g., metal; plastic) that is sufficiently rigid and/or supportive to support the cleaning tip 120. The cleaning tip 120 may be formed from a material that provides gentle contact and movement along the first surface 110 and the second surface 112 to remove substantially all material from the gap 106, the first surface 110, and the second surface 112. For example, the cleaning tip 120 may be a compressible material (e.g., textile, such as felt; foam; plastic; rubber; elastomer polytetrafluoroethylene [PTFE]) and/or may have a textured surface (e.g., integrally formed and/or coupled thereto; soft bristles).

The cleaner 118 has dimensions suitable for slidable motion within the conduit 124. In this case, the cleaner 118 has a rectangular shape, and the conduit 124 also has a rectangular shape. The cleaner 118 has dimensions less than dimensions of the conduit 124, so the cleaner 118 can move within the conduit 124. It should be noted that the cleaner 118 can have any suitable shape for moving within the conduit 124, which can also have any suitable shape. In certain embodiments, the cleaning tip 120 has dimensions selected to provide a tight fit within the conduit 124 at the end opening 128 thereof. As noted herein, the cleaning tip 120 may retract into the conduit 124, such as by moving the slide member 122 along the body portion 104 away from the head portion 102. The cleaning tip 120 may have dimensions larger than a remainder of the cleaner 118 (e.g., along the lateral axis 4), but small enough to retract into the end opening 128 of the conduit 124 (e.g., upon or with compression of the cleaning tip 120). The cleaning tip 120 can have dimensions, such that when the cleaning tip 120 retracts into the conduit 124, the tight fit of the cleaning tip 120 within the end opening 128 provides a scouring and/or squeezing pressure to the material of the cleaning tip 120 to remove the material from the cleaning tip 120. In this way, the material removed from the gap 106, the first surface 110, and the second surface 112 by the cleaning tip 120 (and subsequently carried on the cleaning tip 120) is removed from the cleaning tip 120 automatically by retracting the cleaning tip 120 into the end opening 128 of the conduit 124.

In certain embodiments, a resilient member 130 (e.g., biasing member, coil spring, rubber band) is disposed within the conduit 124 to provide retracting force for the cleaner 118. Shown in FIG. 3 in phantom, the resilient member 130 is a coil spring in this case and is disposed around the cleaner 118 between the end opening 128 of the conduit 124 and the slide member 122 along the axial axis 2. A retention feature 132 is positioned at or proximate to the end opening 128 of the conduit 124 to retain the resilient member 130 between the retention feature 132 and the slide member 122 along the axial axis 2. The retention feature 132 may be a ledge (e.g., annular ledge, shelf, protrusion, tab, bump) that extends radially inward from an interior wall of the conduit 124. As the slide member 122 is operated to drive the cleaner 118 through the end opening 128 to extend the cleaning tip 120 into the gap 106, the slide member 122 and the retention feature 132 cooperate to compress the resilient member 130, which develops a retracting force under compression. When the slide member 122 is released (e.g., by the operator), the retracting force of the resilient member 130 retracts the cleaner 118 into the conduit 124, bringing the cleaning tip 120 into the end opening 128 of the conduit 124 to provide cleaning contact between the cleaning tip 120 and the end opening 128 of the conduit 124 (e.g., driving the cleaning tip 120 into the end opening 128 of the conduit 124 to scrape the material from the cleaning tip 120 and/or to compress the cleaning tip 120 to squeeze the material from the cleaning tip 120).

It should be appreciated that one or more seal elements (e.g., annular seal elements; elastomer seal elements; O-rings) may be provided to form a seal (e.g., annular seal) about the cleaner 118 to block the material from passing into the conduit 124. The one or more seal elements may be located on the cleaner 118 and/or within the conduit 124 (e.g., the retention feature 132 may operate as one of the one or more seal elements).

Figure 4:
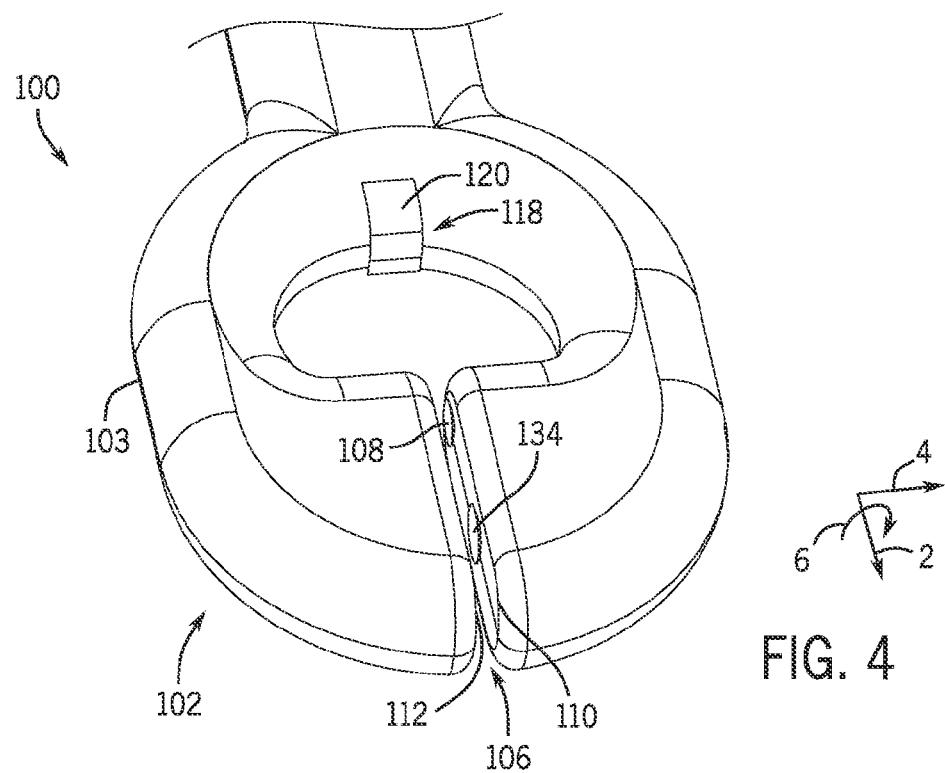
FIG. 4 is a detail view of the head portion of the electrical stability probe of FIG. 1, wherein a temperature sensor, according to an embodiment.

FIG. 4 is a detailed view of the head portion 102 of the electrical stability probe 100 of FIG. 1, according to an embodiment. As shown in FIG. 4, one electrode 108 is disposed at the first surface 110. Further, as shown in FIG. 2, another electrode 108 is disposed at the second surface 112. The electrodes 108 are aligned with one another (e.g., along the axial axis 2) and face each other (e.g., along the lateral axis 4; across the gap 106) to form an electric field in the gap 106 when power is supplied to the electrodes 108.

As shown, the electrical stability probe 100 may also include a temperature sensor 134. The temperature sensor 134 may be located on the head structure 103, such as at the first surface 110. In certain embodiments, to facilitate measuring a temperature of the material in the gap 106, the temperature sensor 134 may be positioned in the gap 106 (e.g., at the first surface 110) and is spaced apart from the electrodes 108 (e.g., along the axial axis 2). In this way, the electrical stability probe 100 may facilitate measuring the electrical properties of the material in the gap 106 with the temperature in the standard range (e.g., the target range; set by API 13B-2). It should be appreciated that the temperature sensor 134 may be located at the second surface 112 or any other suitable surface of the head structure 103. Further, it should be appreciated that one or more additional temperature sensors may be provided on the head structure 103.

In certain embodiments, the electrodes 108 are positioned at a portion (e.g., proximal portion) of the gap 106 that is near (e.g., proximate) the body portion 104. Locating the electrodes 108 close to the body portion 104 in this manner provides ready access for the cleaning tip 120 to reach between the electrodes 108 and to contact both of the electrodes 108 with cleaning force. In certain embodiments, the temperature sensor 134 is spaced apart from the electrodes 108 (e.g., along the axial axis 2) to provide access for the cleaning tip 120 to reach the temperature sensor 134 and to capture the temperature measurements of the material in a vicinity of the electrodes 108, but also to block any effect of the temperature sensor 134 on the electric field formed between the electrodes 108. For example, in FIG. 4, the temperature sensor 134 is located near a middle location of the gap 106 (e.g., approximately midway between the electrodes 108 and a distal end of the gap 106 and/or the head structure 103 along the axial axis 2). Further, such placement of the temperature sensor 134 (e.g., in the middle location of the gap 106; away from the distal end of the gap 106 and/or the head structure 103) may also separate the temperature sensor 134 from a bottom surface of a container that holds the material, which may result in the temperature sensor 134 capturing more accurate temperature measurements for the material in the vicinity of the electrodes 108 (e.g., away from a heater under the container that holds the material, as compared to placement of the temperature sensor 134 at or near the distal end of the gap 106 and/or the head structure 103, which may contact the bottom surface of the container that holds the material). In this case, the temperature sensor 134 is spaced apart from one of the electrodes 108 on the first surface 110 by at least a full dimension of the electrode 108. The temperature sensor 134 and the electrodes 108 are both depicted as circular, disk-like members, but the temperature sensor 134 and the electrodes 108 can have any suitable and/or convenient shape.

Further, the electrodes 108 are generally made of any suitable conductive material, for example gold, copper, or gold plating over a suitable metal material. The temperature sensor 134 may be a thermocouple or a resistive temperature device, which can be made of a suitable material, such as stainless steel or platinum. The temperature sensor 134 and/or the electrodes 108 may be supported within respective recesses (e.g., grooves) defined in the head structure 103 (e.g., the first surface 110 and the second surface 112) so as to be protected within the head structure 103 and/or so as to be flush with the head structure 103 (e.g., the first surface 110 and the second surface 112), which may maintain the gap 106 and/or facilitate cleaning with the cleaner 118. It should be appreciated that one or more additional temperature sensors may be disposed on the electrical stability probe 100. Further, the temperature sensors 134 and/or the one or more additional temperature sensors may be disposed at any suitable position location of the electrical stability probe 100, such as at the first surface 110, the second surface 112, and/or along other surface(s) of the head structure 103, for example. With reference to FIG. 1 and FIG. 4, it should also be appreciated that conductors (e.g., electrical conductors or wires that transmit power and/or signals) may connect to the temperature sensor 134 and the electrodes 108, extend through the head structure 103 of the head portion 102, through the handle 105 of the body portion 104, and into a cable 136.

Figure 5:
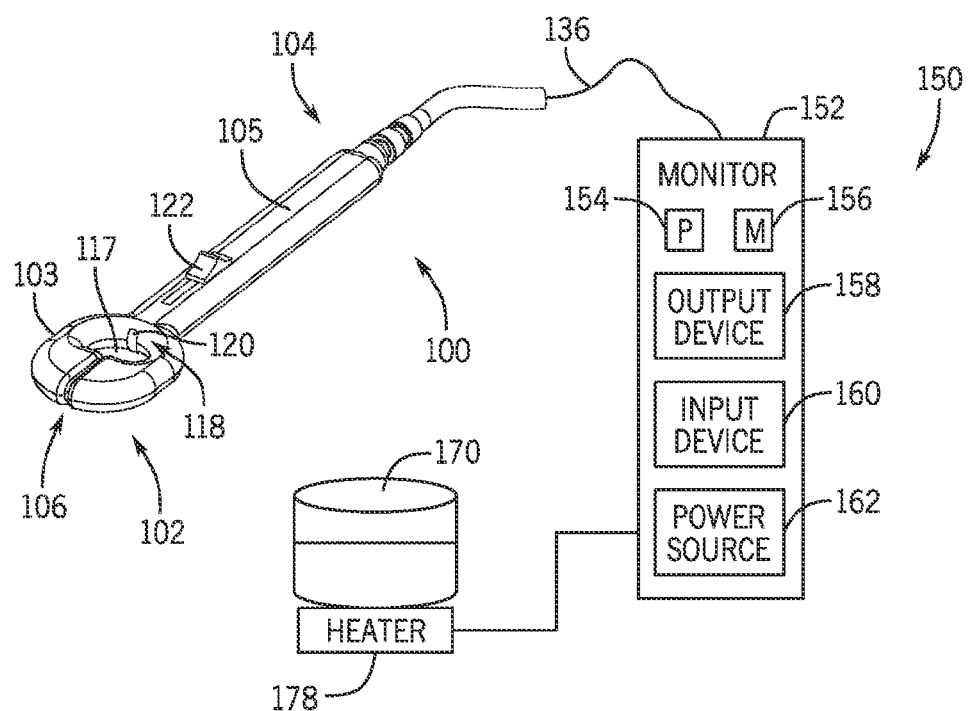
FIG. 5 is schematic diagram of an electrical stability monitoring system with the electrical stability probe of FIG. 1, according to an embodiment.

FIG. 5 is schematic diagram of an electrical stability monitoring system 150 with the electrical stability probe of FIG. 1, according to an embodiment. As shown, the electrical stability monitoring system 150 includes a monitor 152 (e.g., electrical stability monitor; computing system; computing device; controller) with a processor 154, a memory device 156, an output device 158, an input device 160, and/or a power source 162 (e.g., battery). The electrical stability probe 100 is coupled to the monitor 152, such as via the cable 136. However, while a wired connection between the electrical stability probe 100 and the monitor 152 is shown in FIG. 5, it should be appreciated that the electrical stability probe 100 and the monitor 152 may include communication components (e.g., wireless transceivers) that provide a wireless connection between the electrical stability probe 100 and the monitor 152 (e.g., to communicate via radiofrequency waves).

At certain times (e.g., periodically during drilling operations), the operator may use the electrical stability monitoring system 150 to measure the electrical properties of the material. For example, the operator may place a sample of the material in a container 170. Then, the operator may grip the handle 105 of the body portion 104 of the electrical stability probe 100 and insert the head structure 103 of the head portion 102 of the electrical stability probe 100 into the sample of the material in the container 170. In some cases, the operator may move the electrical stability probe 100 to mix (e.g., swirl) the sample of the material in the container 170. It should be appreciated that a geometry of the head structure 103 (e.g., expanded diameter; the opening 117) may facilitate mixing of the sample of the material in the container 170.

The operator may also provide an input via the input device 160 to initiate and/or to carry out an electrical stability test for the material. For example, the operator may actuate a key (e.g., physical or virtual button) on the monitor 152 to initiate the electrical stability test for the material. Then, the monitor 152 may instruct a heater 178 to adjust (e.g., increase) a temperature of the sample of the material, and the monitor 152 may also receive and/or request temperature data (e.g., signals) from the temperature sensor 134 of the electrical stability probe 100. In this way, the monitor 152 may determine and/or monitor the temperature of the sample of the material.

The monitor 152 may compare the temperature of the sample of the material to a standard range (e.g., target range; set by API 13B-2). In response to determining that the temperature of the sample of the material is within the standard range and/or while the temperature of the sample of the material is within the standard range, the monitor 152 obtain a first electrical reading from the electrodes 108 (e.g., the monitor 152 may instruct an increase in a voltage and monitor a current between the electrodes 108, and then the monitor 152 may identify and record a peak voltage when the current between the electrodes 108 corresponds to a target or threshold value, such as 61 µA).

In some embodiments, in response to obtaining the first electrical reading from the electrodes 108, the monitor 152 may provide an output via the output device 158. For example, the monitor 152 may provide a visual notification (e.g., the peak voltage; a text message) via a display and/or an audible notification (e.g., an alarm) via a speaker to notify the operator that the first electrical reading is complete and that the operator should complete a cleaning operation with the cleaner 118.

Then, the operator may apply a force to the slide member 122 to move the slide member 122 toward the head portion 102 until the cleaning tip 120 enters the gap 106 (e.g., brushes past the electrodes 108 and the temperature sensor 134). Then, the operator may apply another force to the slide member 122 to move the slide member 122 away from the head portion 102 and/or the operator may release the slide member 122 to cause the resilient member 130 to retract the cleaner 118, to thereby withdraw the cleaning tip 120 from the gap 106 and into the conduit 124 of the electrical stability probe 100. As described herein, the electrical stability monitoring system 150 may be configured to carry out the cleaning process in the automated manner (e.g., without human manipulation of input devices and/or the electrical stability probe 100 and components thereof). For example, in response to obtaining the first electrical reading from the electrodes 108, the monitor 152 may provide control signals to an actuator of the electrical stability probe 100 to adjust a position of the cleaner 118 (e.g., between the extended position and the retracted position) to carry out the cleaning process in the automated manner. In some such cases, the electrical stability probe 100 may include various structural features, such as a solenoid that is configured to receive the control signals from the monitor 152 and actuate to adjust the position of the cleaner 118, a piston that is configured to receive fluid (e.g., hydraulic fluid) and actuate to adjust the position of the cleaner 118, and/or any other suitable structure capable of moving the cleaner 118 based on the control signals. Further, the electrical stability probe 100 may include one or more sensors (e.g., proximity sensors) to detect movement of the cleaner 118. The one or more sensors may provide signals to the monitor 152 to enable the monitor 152 to determine and/or to confirm appropriate movement of the cleaner 118 for the cleaning process.

Then, immediately or after some amount of time (e.g., set by API 13B-2), the monitor 152 may instruct the heater 178 to operate to adjust (e.g., increase) the temperature of the sample of the material and/or the monitor 152 may receive and/or request the temperature data from the temperature sensor 134 of the electrical stability probe 100. Again, the monitor 152 may compare the temperature of the sample of the material to the standard range. In response to determining that the temperature of the sample of the material is within the standard range and/or while the temperature of the sample of the material is within the standard range, the monitor 152 obtain a second electrical reading from the electrodes 108 (e.g., the monitor 152 may identify and record another peak voltage when the current between the electrodes 108 corresponds to the target or threshold value).

In some embodiments, in response to obtaining the second electrical reading from the electrodes 108, the monitor 152 may provide another output via the output device 158 to notify the operator that the second electrical reading is complete and that the operator should complete another cleaning operation with the cleaner 118. It should be appreciated that the electrical stability probe 100 may be withdrawn or removed from the sample of the material for the cleaning operation(s). Further, between the first electrical reading and the second electrical reading, the electrical stability probe 100 may be held outside of the sample of the material in order for the temperature sensor 134 to equilibrate (e.g., at least until readings from the temperature sensor 134 are stable), and then the electrical stability probe 100 may be handled to insert the head structure 103 of the head portion 102 of the electrical stability probe 100 back into the sample of the material to obtain the second electrical reading.

The monitor 152 may process the first electrical reading and the second electrical reading to yield a final analysis (e.g., average the first electrical reading and the second electrical reading to yield a result). Further, the monitor 152 may output the final analysis via the output device 158 (e.g., via presentation of the result on the display) and/or may communicate the final analysis to a separate computing system or device (e.g., to a mobile device of the operator; to a remote desktop computer or server; to a storage device for recordation in a database, such as in a data repository or log for a wellsite and/or a cloud system). While two electrical readings are described (e.g., for compliance with API 13B-2), it should be appreciated that the electrical stability monitoring system 150 may be configured to obtain any number of electrical readings (e.g., 1, 2, 3, 4, or more) and then evaluate the electrical readings to yield the final analysis (e.g., average the electrical readings to yield the result).

The processor 154 may be processing circuitry that includes one or more processors configured to execute software, such as software for processing signals (e.g., from the temperature sensor 134 and the electrodes 108) and/or controlling components of the electrical stability monitoring system 150 (e.g., the output device 158). The memory device 156 may include one or more memory devices (e.g., a volatile memory, such as random access memory [RAM], and/or a nonvolatile memory, such as read-only memory [ROM]) that may store a variety of information and may be used for various purposes. For example, the memory device 156 may store processor-executable instructions (e.g., firmware or software) for the processor 154 to execute, such as instructions for processing signals (e.g., from the temperature sensor 134 and the electrodes 108) and/or controlling components of the electrical stability monitoring system 150 (e.g., the output device 158). It should be appreciated that the monitor 152 may include various other components, such as a communication device (e.g., wireless transceiver) that is capable of communicating data and/or other information to various other devices (e.g., a remote desktop computer or server, the Internet, a cloud system).

It should be appreciated that the monitor 152 may be a dedicated and/or contained controller with processing circuitry that carries out the various techniques disclosed herein. However, the monitor 152 may be part of and/or include a distributed controller (e.g., remote computing system and/or cloud computing system) with processing circuitry that carries out the various techniques disclosed herein. Thus, while certain operations are described as being performed by the monitor 152 to facilitate discussion, it should be appreciated that the various techniques disclosed herein may be performed by any suitable device and/or distributed between any suitable combination of devices (e.g., the processor 154 of the monitor 152, on-board processing circuitry of the electrical stability probe 100, processing circuitry of the remote computing system, and/or processing circuitry of the cloud computing system).

Additionally, the monitor 152 may include the output device 158, such as a display that is configured to display the probe readings and/or other result (e.g., the average probe readings). For example, the monitor 152 may be configured to instruct the display to present one, two, or more temperature readings; an indication of whether each temperature reading complies with the standards; a prompt to an operator when a temperature reading complies with the standards; one, two, or more related electrode readings; whether two electrode readings comply with the standards (e.g., by being no more than some percentage, such as 5%, apart); an average of the electrode readings; and/or a message indicating whether any measurement is compliant or non-compliant based on comparison (e.g., by the monitor) of the temperature readings with the range required by the standards and/or based on comparison (e.g., by the monitor) of two electrode readings with some percentage required by the standard (e.g., whether the two electrode readings are within 5% of each other). Further, the output device 158 may operate as the input device 160 (or an additional input device) of the monitor 152. For example, the output device 158 may include a touch screen display that presents virtual keys or buttons that may be selected by the operator to provide inputs.

Figure 6:
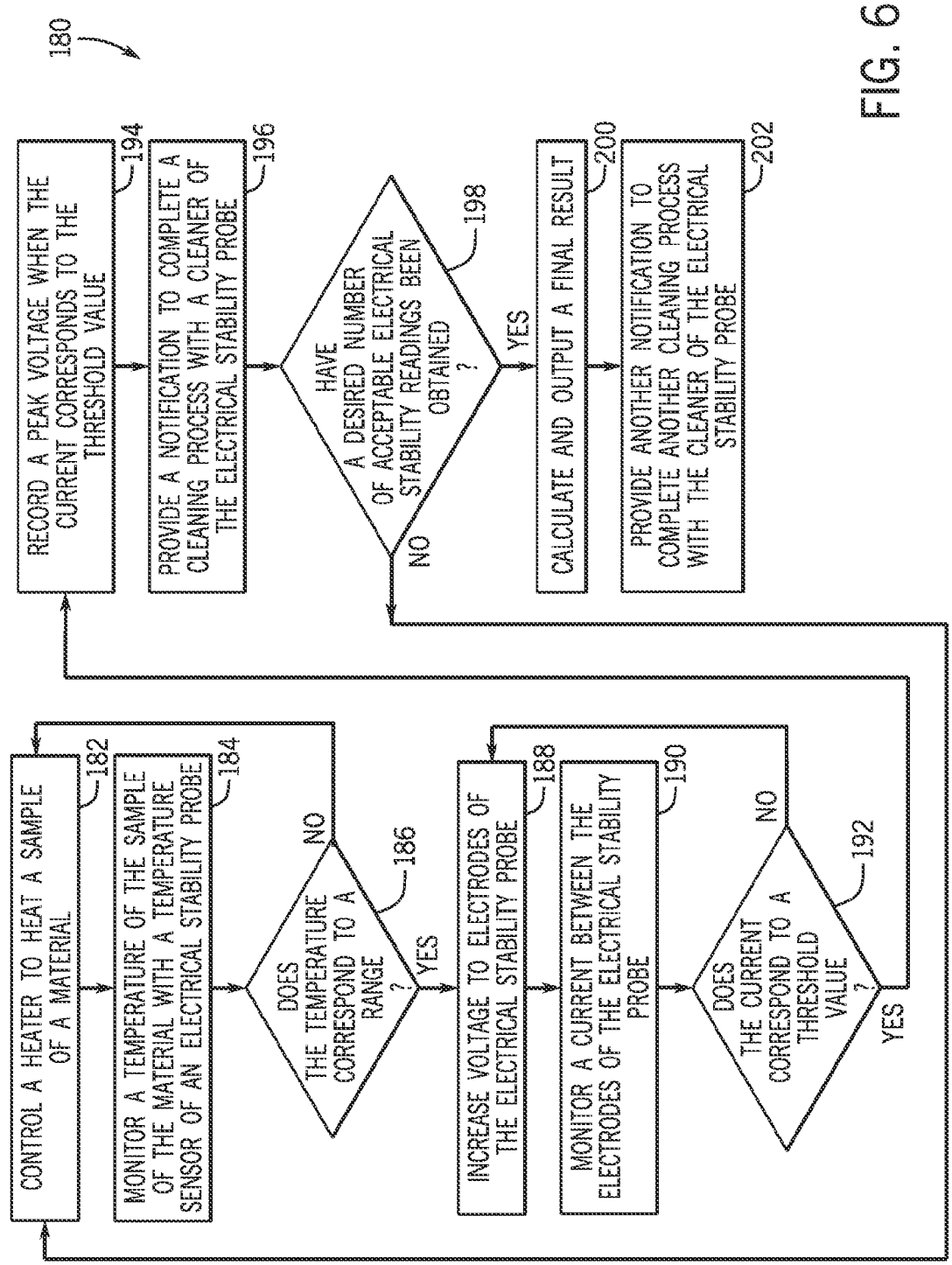
FIG. 6 is a flow diagram of a method of using the electrical stability monitoring system of FIG. 5, according to an embodiment.

FIG. 6 is a flow diagram of a method 180 of using the electrical stability monitoring system 150 of FIG. 1, according to an embodiment. It should be appreciated that steps of the method 180 may be performed by processing circuitry (e.g., the monitor 152). It should be appreciated that steps may be omitted, steps may be added, and/or steps may be carried out in any suitable order.

In block 182, the method 180 may begin with controlling a heater to heat a sample of material (e.g., a fluid in a container). In block 184, the method 180 may include monitoring a temperature of the sample of the material with a temperature sensor of an electrical stability probe. As described herein, the temperature sensor may be integrated into the electrical stability probe (e.g., within a housing and/or along a surface of the housing of the electrical stability probe).

In block 186, if the temperature does not correspond to a range (e.g., a standard range; set by API 13B-2), then the method 180 may return to block 182. However, if the temperature corresponds to the range, then the method 180 may proceed to block 188. In block 188, the method 180 may include providing (e.g., increasing) a voltage to electrodes of the electrical stability probe. As described herein, the electrodes may be integrated into the electrical stability probe (e.g., within the housing and/or along the surface of the housing of the electrical stability probe; proximate to the temperature sensor).

In block 190, the method 180 may include monitoring a current between the electrodes of the electrical stability probe. In block 192, if the current does not correspond to a threshold value (e.g., set by API 13B-2; 61 µA), then the method 180 may return to block 188. However, if the current corresponds to the threshold value (e.g., meets or exceeds the threshold value), then the method 180 may proceed to block 194.

In block 194, the method 180 may include recording a peak voltage when the current corresponds to the threshold value. In block 196, the method 180 may include providing a notification to complete a cleaning process (e.g., a cleaning operation) with a cleaner of the electrical stability probe. As described herein, the cleaner may be integrated into the electrical stability probe (e.g., within the housing of the electrical stability probe). The notification may prompt the operator to withdraw the electrical stability probe from the sample of the material, apply a force to a slide member to extend the cleaner from a conduit formed in the housing of the electrical stability probe and into a gap defined by the housing to clean the temperature sensor and/or the electrodes positioned at the gap (e.g., exposed to and/or facing the gap). Upon completion of the cleaning process, the operator may apply another force to the slide member to withdraw the cleaner from the gap and to retract the cleaner into the conduit formed in the housing of the electric stability probe. Additionally or alternatively, the operator may release the slide member to enable a resilient member to drive the cleaner into the conduit formed in the housing of the electric stability probe. The notification may include a visual output (e.g., a text message; the peak voltage) and/or an audible output (e.g., an alarm).

In block 198, if a desired number of acceptable electrical stability readings have not been obtained (e.g., less than two readings obtained while the temperature is within the range, as set by API 13B-2), then the method 180 may return to block 182. However, if the desired number of acceptable electrical stability readings have been obtained (e.g., two readings obtained while the temperature is within the range and the two readings are within 5% of one another, as set by API 13B-2), then the method 180 may proceed to block 200. In block 200, the method 180 may include calculating and/or outputting a final result (e.g., an average of the electrical stability readings). For example, the method 180 may include presenting the final result on a display, storing the final result (e.g., in a database), and/or communicating the final result to another computing system (e.g., for display at a remote computing station; for automated control for modification to the material, such as additions and/or dilutions for drilling fluid, based on the final result). In block 202, the method 180 may include providing another notification to complete another cleaning process (e.g., another cleaning operation) with the cleaner of the electrical stability probe. It should be appreciated that outputting the final result in block 200 may operate as the another notification that is intended to prompt the operator to complete the another cleaning process.

Importantly, as set forth in the method 180 of FIG. 6, the temperature sensor, the electrodes, and the cleaner are part of the electrical stability probe. Accordingly, the method 180 may be carried out in an efficient manner (e.g., with a single instrument) and in an accurate manner (e.g., with accurate temperature readings obtained near the electrodes).

It should be appreciated that the electrical stability monitoring system 150 may support any of a variety of levels of automation. For example, the electrical stability monitoring system 150 may carry out any of the blocks 182-202 in an automated manner (e.g., without human manipulation of input devices and/or the electrical stability probe and components thereof). In some embodiments, the electrical stability monitoring system 150 may be configured to carry out any of the blocks 182-202 in the automated manner, including accessing the range, the threshold value, the desired number, and/or other standards (e.g., according to the API 13B-2) and also carrying out the controlling, monitoring, comparing, analysis, notifying, calculating, outputting, and so forth. In some embodiments, the electrical stability monitoring system 150 may be configured to carry out the cleaning process in the automated manner. In some such cases, the electrical stability probe may include various structural features, such as a solenoid that is configured to receive control signals and actuate to adjust a position of the cleaner (e.g., between the extended position and the retracted position), a piston that is configured to receive fluid (e.g., hydraulic fluid) and actuate to adjust the position of the cleaner, and/or any other suitable structure capable of moving the cleaner based on the control signals.

Accordingly, as described herein, an electrical stability monitoring system may include a monitor and an electrical stability probe. The monitor may be configured to control various aspects of probe operation, as well as to collect and/or interpret signals from the electrical stability probe. In particular, the electrical stability probe may be configured to receive signals from one or more temperature sensors and from electrodes, relate signals from the electrodes to signals from the temperature sensor (e.g., using a time horizon), analyze probe readings (e.g., average probe readings according to API standards), and/or determine whether the probe readings comply with standards (e.g., the API standards) by comparing temperature readings with a temperature range set forth in the standards.

While the foregoing is directed to embodiments of the present disclosure, other and further embodiments of the present disclosure may be devised without departing from the basic scope thereof, and the scope thereof is determined by the claims that follow. Further, any features shown in FIGS. 1-6 or described with reference to FIGS. 1-6 may be combined in any suitable manner The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for (perform) ing (a function) . . . " or "step for (perform) ing (a function) . . . ", it is intended that such elements are to be interpreted under 35 U.S.C. 112 (f). However, for any claims containing elements designated in any other manner, it is intended that such elements are not to be interpreted under 35 U.S.C. 112 (f).

We claim:

1. A fluid electrical probe, comprising:
    a body portion housing a cleaner;
    a head portion comprising two opposed surfaces forming a gap;
    first and second electrodes, the first electrode being disposed on a first surface of the two opposed surfaces, and the second electrode being disposed on a second surface of the two opposed surfaces; and
    a temperature sensor disposed on the first surface or the second surface, wherein the cleaner is extendable into the gap to clean the first and second electrodes and the temperature sensor.

2. The fluid electrical probe of claim 1, wherein the body portion comprises a handle configured to be gripped by an operator.

3. The fluid electrical probe of claim 1, wherein the head portion comprises a c shaped structure that extends from the body portion and defines the gap.

4. The fluid electrical probe of claim 1, wherein the head portion comprises two curved prongs that define an opening between the two curved prongs along a lateral axis and between the body portion and the gap along an axial axis.

5. The fluid electrical probe of claim 1, wherein the first electrode is laterally spaced from the second electrode.

6. The fluid electrical probe of claim 5, wherein the first electrode or the second electrode is positioned between the temperature sensor and the body portion relative to an axial axis.

7. The fluid electrical probe of claim 1, wherein the cleaner comprises a rod that supports a cleaning tip, wherein a respective dimension of the rod along a lateral axis is less than a respective dimension of the cleaning tip along the lateral axis.

8. The fluid electrical probe of claim 7, comprising a conduit within the body portion, wherein a respective dimension of an end portion of the conduit is configured to cause the end portion of the conduit to contact the cleaning tip as the cleaner is retracted into the conduit.

9. The fluid electrical probe of claim 8, wherein the respective dimension of the end portion of the conduit is configured to cause the end portion of the conduit to compress the cleaning tip as the cleaner is retracted into the conduit.

10. The fluid electrical probe of claim 1, wherein a cleaning tip of the cleaner comprises a compressible material.

11. The fluid electrical probe of claim 1, comprising a mechanical member accessible to an operator along the body portion and coupled to the cleaner to enable the operator to apply a force to the mechanical member to extend the cleaner into the gap to clean the first and second electrodes and the temperature sensor.

12. The fluid electrical probe of claim 11, wherein the mechanical member comprises a slide member, and the fluid electrical probe comprises a resilient member configured to retract the cleaner from the gap and into the body portion upon release of the slide member by the operator.

13. A monitoring system, comprising:
    a fluid electrical probe comprising a housing, wherein the housing comprises:
        a handle comprising a conduit that slidingly supports a cleaner; and
        a head structure comprising opposed surfaces that define a gap and support a [n] pair of electrodes at the gap;
    wherein the cleaner is adjustable between a retracted position in which the cleaner is withdrawn from the gap and an extended position in which the cleaner extends into the gap to clean the pair of electrodes.

14. The monitoring system of claim 13, wherein the housing comprises a temperature sensor.

15. The monitoring system of claim 14, comprising processing circuitry configured to:
    receive a temperature signal from the temperature sensor;
    provide voltage to the pair of electrodes in response to determining that the temperature signal indicates a temperature corresponds to a target range;
    receive a current signal from the pair of electrodes;
    record a peak voltage in response to determining that the current signal indicates a current corresponds to a threshold value; and
    after recording the peak voltage, provide a notification to adjust the cleaner from the retracted position to the extended position.

16. The monitoring system of claim 15, wherein the notification comprises a visual notification, an audible notification, or both.

17. The monitoring system of claim 13, wherein the cleaner comprises a rod that supports a cleaning tip, and the cleaning tip comprises a compressible material.

18. The monitoring system of claim 13, wherein the head structure comprises two curved prongs that define an opening and form the opposed surfaces, wherein the conduit is separated from the gap by the opening along an axial axis.

19. A method of measuring an electrical property of a fluid, comprising:
    obtaining a probe that comprises:
        a body portion housing a cleaner;
        a head portion comprising two opposed surfaces forming a gap;
        first and second electrodes, the first electrode being disposed on a first surface of the two opposed surfaces, and the second electrode being disposed on a second surface of the two opposed surfaces; and
        a temperature sensor disposed on the first surface or the second surface,
    wherein the cleaner is extendable into the gap;
    using the temperature sensor to measure a temperature of the fluid;
    extending the cleaner to clean the first and second electrodes and the temperature sensor; and
    using the first and second electrodes to measure the electrical property of the fluid.

20. The method of claim 19, comprising extending the cleaner from a retracted position in which the cleaner is positioned within a conduit that extends through the body portion and is withdrawn from the gap to an extended position in which the cleaner extends from the conduit and is positioned within the gap to clean the first and second electrodes and the temperature sensor.

\* \* \* \* \*